(12) United States Patent
Bederna et al.

(10) Patent No.: US 6,421,589 B1
(45) Date of Patent: Jul. 16, 2002

(54) METHOD AND ARRANGEMENT FOR DETECTING A CHANGING QUANTITY FOR MOTOR VEHICLES

(75) Inventors: Frank Bederna, Korntal-Muenchingen; Martin Streib, Vaihingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/670,015

(22) Filed: Sep. 26, 2000

Related U.S. Application Data

(62) Division of application No. 08/892,426, filed on Jul. 14, 1997.

(30) Foreign Application Priority Data

Jul. 12, 1996 (DE) .......................................... 196 28 162

(51) Int. Cl.$^7$ .............................................. B60K 41/06
(52) U.S. Cl. ............................ 701/29; 701/54; 701/70; 477/107; 477/73; 477/111
(58) Field of Search ............................. 701/29, 35, 54, 701/70; 477/107, 73, 111, 173; 123/399, 403, 406

(56) References Cited

U.S. PATENT DOCUMENTS

| | | | |
|---|---|---|---|
| 4,660,520 A | 4/1987 | Inoue et al. ................. | 123/399 |
| 5,161,505 A | 11/1992 | Bederna et al. ............. | 123/399 |
| 5,229,957 A | 7/1993 | Hahn et al. ................... | 702/94 |
| 5,309,759 A | 5/1994 | Marshall ..................... | 73/118.1 |
| 5,445,126 A | 8/1995 | Graves, Jr. .................. | 123/399 |
| 5,480,364 A | * 1/1996 | Hilbert et al. .............. | 477/107 |

FOREIGN PATENT DOCUMENTS

| | | |
|---|---|---|
| EP | 0641924 | 3/1995 |
| FR | 2616848 | 12/1988 |

* cited by examiner

*Primary Examiner*—William A. Cuchlinski, Jr.
*Assistant Examiner*—Arthur D. Donnelly
(74) *Attorney, Agent, or Firm*—Walter Ottesen

(57) ABSTRACT

The invention is directed to a method and an arrangement for detecting a changing quantity for a motor vehicle. The changing quantity is the position of an operator-controlled element. At least one stop value is determined for the operator-controlled element when released. Outside of the operation of the motor vehicle, this stop value is dependent upon the operation of a test apparatus connected to the control unit of the motor and/or when a defined state of the control unit and/or when there is a defined sequence of specific actuations of operator-controlled elements.

4 Claims, 5 Drawing Sheets

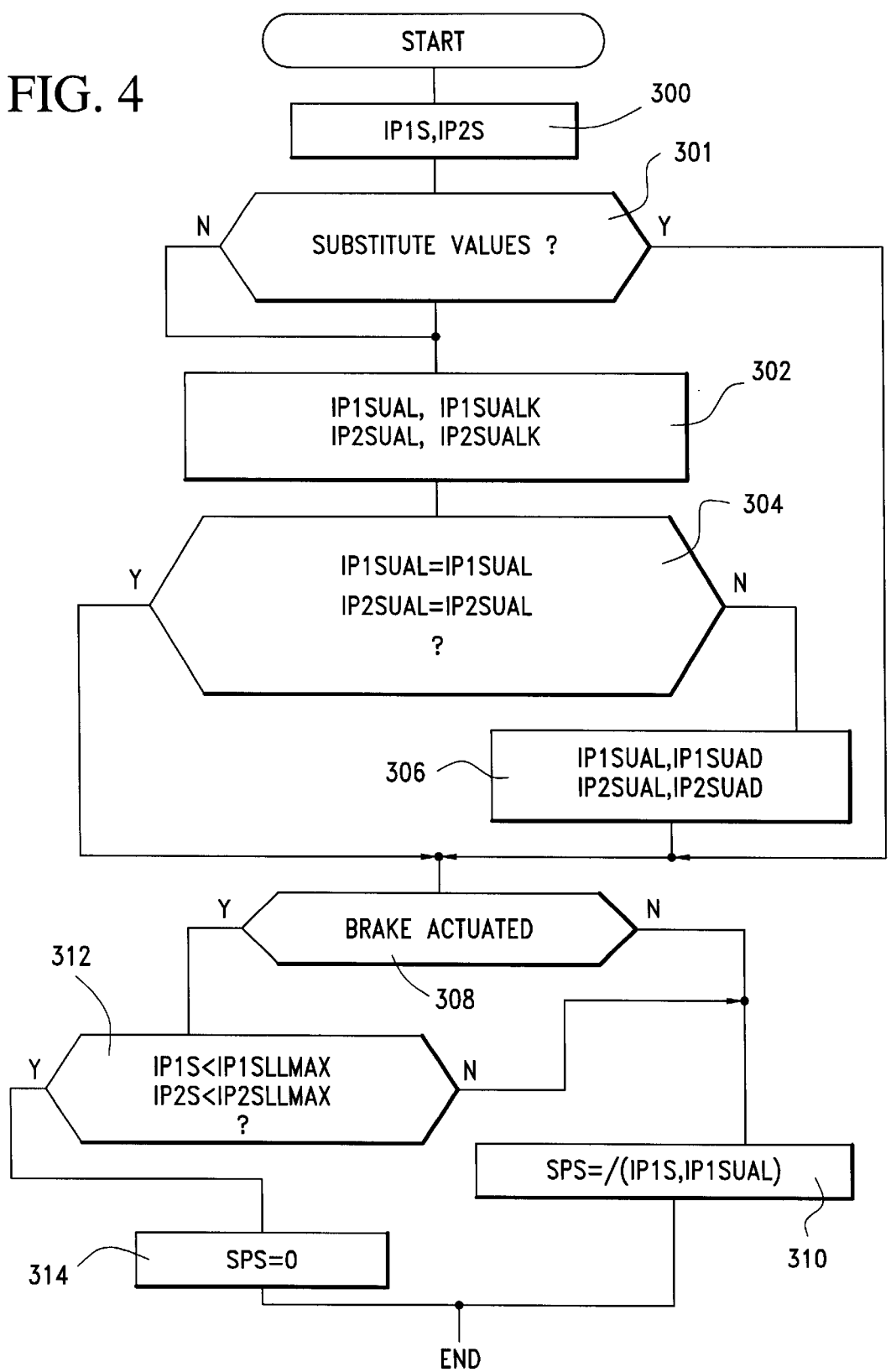

METHOD AND ARRANGEMENT FOR DETECTING A CHANGING QUANTITY FOR MOTOR VEHICLES

This application is a division of U.S. application Ser. No. 08/892,426, filed Jul. 14, 1997.

BACKGROUND OF THE INVENTION

A method and an arrangement for detecting a changing quantity for motor vehicles are disclosed in U.S. Pat. No. 5,229,957. Here, at least one end stop of a position transducer is determined. The position transducer is coupled to an accelerator pedal of a motor vehicle which is actuated by the driver. This takes place starting from a start value during the operation of the motor vehicle in that the measured position value is continuously compared to the stored end stop value and the stored end stop value is overwritten by the actual position signal value when the position signal exceeds the stored stop value. The position signal of the accelerator pedal is evaluated for engine control and is determined on the basis of the at least one stored stop value and the measured signal value of the position transducer. A defectively detected and/or stored stop value leads to an erroneous computation of the position signal of the accelerator pedal and, in some individual cases, can lead to an unwanted control of the engine of the vehicle.

SUMMARY OF THE INVENTION

It is an object of the invention to provide measures which ensure a precise and reliable initial and/or continuous (during operation) determination of at least one stop value of a changing quantity for motor vehicles.

The solution of the invention permits a reliable and precise detection of the stop values of a measurement signal such as a position signal of an operator-actuated element of a motor vehicle.

In a preferred embodiment, it is especially advantageous that transfer resistors have no permanent influence on the stored stop value when utilizing potentiometers to detect the position of an accelerator pedal or a throttle flap. These transfer resistors can otherwise lead to lower measured values.

It is especially advantageous that the detection of the at least one stop value takes place when the position transducer is built into the motor vehicle as a new element so that a storage of a stop value based on defective data during operation of the vehicle can be effectively avoided.

This leads to the important advantage that the correctness of the learned value can be checked by the automobile manufacturer. For an exchange of components (for example, when the position transducer of the operator-controlled element or the operator-controlled element itself is exchanged), this operation must be repeated in a service station. Here too, the correctness of the value can be checked in the service center.

It is especially advantageous that the stored stop value (at the start of an operation cycle when the engine is started) is only assumed when the detected position signal satisfies special criteria. This is especially so when a change of the stored stop value is possible during operation.

It is especially advantageous that, during operation with the brake actuated and the accelerator pedal released, the determined position signal is set independently of the stored stop value to a value which represents the released accelerator pedal.

It is especially further advantageous that the stored stop value is stored in duplicate in the memory so that the duplicately stored value pair can be checked with each call up as to correctness.

Especially advantageous is the input of substitute values when there is noncoincidence of the stored stop values or for a detection operation which cannot be carried out for these stop values.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
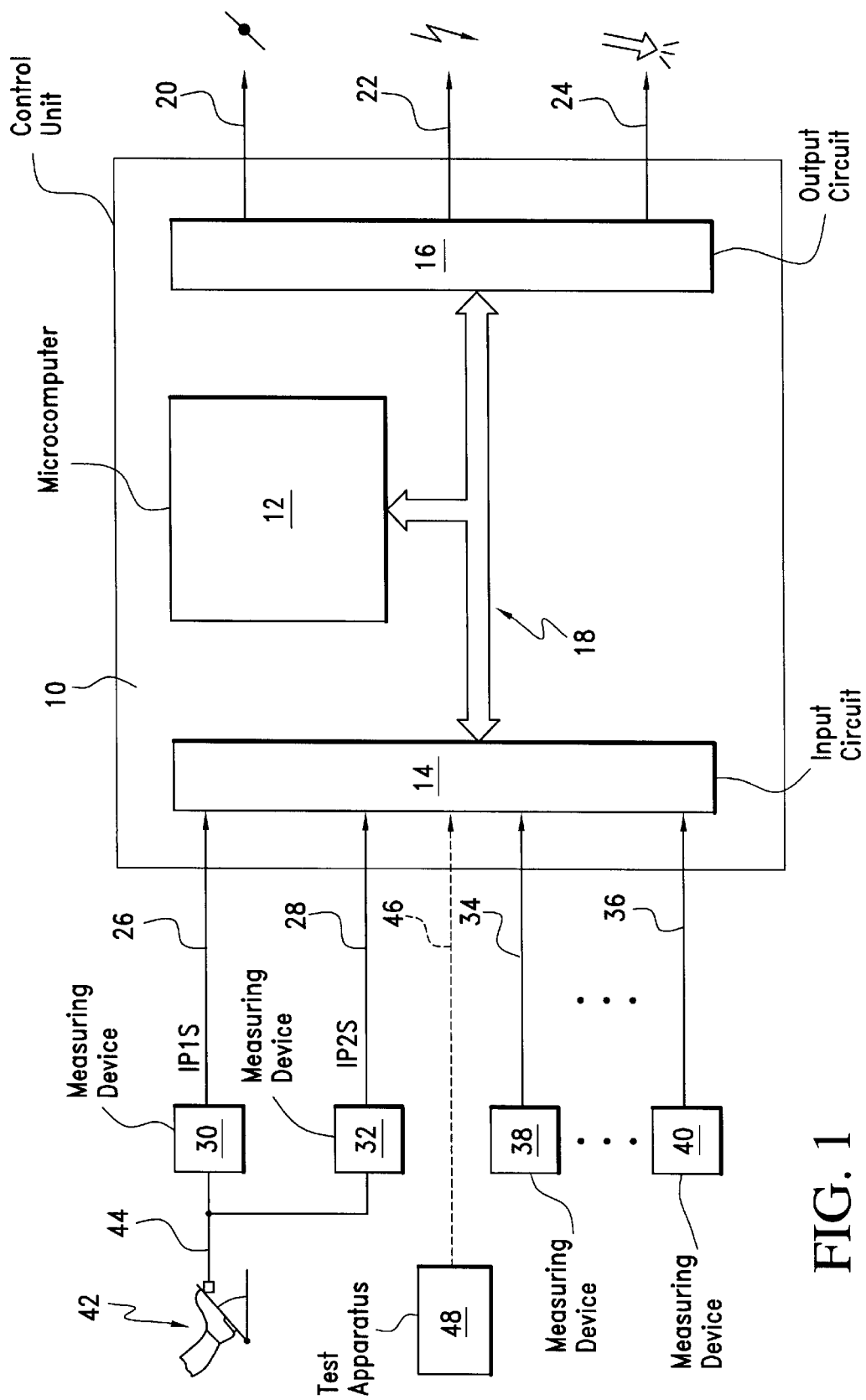
FIG. 1 is an overview block circuit diagram of an arrangement for controlling a motor such as an internal combustion engine in dependence upon the position of an operator-actuated element.

FIG. 1 shows a control unit 10 which includes: at least one microcomputer 12, an input circuit 14 and an output circuit 16. These elements are interconnected via a communication bus 18.

In the preferred embodiment, the control unit 10 is a control unit for controlling an internal combustion engine. The control unit 10 influences via output lines 20, 22 and 24 the air input to the engine, the ignition time point and the fuel injection quantity, respectively.

In other advantageous embodiments, the internal combustion engine can be a diesel engine (control of injection start and fuel quantity) or it can be an electric motor wherein the current supplied to the electric motor is controlled. At the input end, input lines 26 and 28 from measuring devices 30 and 32, respectively, as well as further input lines 34 to 36 from measuring devices 38 to 40, respectively, are connected to the control unit 10. The measuring devices 30 and 32 detect the position of the operator-controlled element and measuring devices 38 to 40 detect additional operating variables of the vehicle or its drive unit such as a brake-actuating signal, a load signal, an rpm signal, et cetera. The measuring devices 30 and 32 for detecting the position of the operator-controlled element 42 (preferably an accelerator pedal) are connected to the element 42 via a mechanical connection 44. The two measuring devices are of the same type (such as potentiometers) and output, independently of each other, measurement signals IP1S and IP2S in dependence upon the actuation of the operator-controlled element 42 to the control unit 10 via lines 26 and 28, respectively.

Furthermore, an input line 46, which connects the control unit 10 to a test apparatus 48, is connected at specific time points. This test apparatus 48 is either connected by appropriate personnel at the end of the assembly line of the vehicle production or during a visit to a service center.

In normal operation, the microcomputer 12 computes a desired value for a quantity representing the output power of the engine on the basis of at least one of the position values IP1S and IP2S. This quantity can, for example, be a desired value for the position of the throttle flap or for the torque of the engine, et cetera. Here, and if required, additional operating variables such as engine rpm, engine temperature, et cetera, are considered. The adjustment of the engine power takes place in the context of control loops such as in the context of a position control loop for the throttle flap and/or in the context of a torque control loop. Furthermore, the operability of the detection of the position of the operator-controlled element 42 is checked via a comparison of the two signal values IP1S and IP2S with respect to each other. In the case of a fault, the control system is switched off or the power of the motor is limited.

The measuring devices 30 and 32 are respective position transducers 30 and 32 and are used to detect the position of the operator-controlled element 42. In several embodiments, the position transducers 30 and 32 (or the connection 44) exhibit large tolerances which are to be considered in the conversion of the accelerator pedal position into the power desired value. For this reason, it is desirable when the position value for the operator-controlled element 42, which value is determined from the measurement signal, is formed on the basis of at least one reference value which considers the tolerances. As such a reference value, the measurement value in the released position of the operator-controlled element (that is, the lower stop of the position transducer) has been shown to be suitable.

In a first embodiment of the invention, this end position of the operator-controlled element is determined when, for a connected test apparatus, the learning operation is initiated. The specific procedure is described with respect to a preferred embodiment shown in FIGS. 2a and 2b.

In a further embodiment, this stop value, which is detected outside of the operation of the motor vehicle, is corrected during the operation in accordance with the state of the art mentioned initially herein in that a new stop value is entered always when the measured value drops below the stored value. In order to avoid that a stop value, which is detected too low, affects the control of the motor, a check is made according to the invention at the start of an operating cycle (ignition on) as to whether the difference between the stored and measured values is within a pregiven value range. If this is not the case, the substitute values are entered; otherwise, the stored stop values are assumed.

Corresponding measures are carried out in another embodiment for checking the correctness of the stored value which is detected outside of the operation. Learning the lower stop of the operator-controlled element during operation does not take place in this embodiment.

For a released accelerator pedal and actuated brakes, a further safety measure is defined by the measure wherein the desired quantities for controlling the engine are set to zero, that is, to the value of the released operator-controlled element. The desired quantities are formed from the measurement signals and the stored values for the end stop. With this measure, possibly incorrectly learned stop values or stop values which changed in an unwanted manner (during operation in the sense of the state of the art as well as for the procedure of the invention outside of the operation) are considered.

In a further embodiment, a tolerance window is pregiven for the lower stop which corresponds to the maximum tolerances without learning procedure or is determined from the stop value detected outside of the operation. For controlling the engine, one always proceeds from a maximum value to which a small safety offset value is added. This offset value can be reduced during operation by means of the learning process known from the state of the art so that the stop value can be reduced at most to the maximum tolerance value or the stop value determined outside of operation.

In addition to the above-mentioned solutions or alternatively thereto, the detected stop value can be stored in duplicate in the permanent memory of the microcomputer. It is especially advantageous when the duplicately stored value is derived from the detection according to the invention of the stop outside of the operation. This value is no longer changed over the service life of the system. However, and for each use of the permanently stored value (that is, in principle for each desired value computation), the stored value pair is checked by a comparison as to accuracy. If the values differ, then the substitute value (maximum tolerance value plus, if required, additional offset value) forms the basis as the stop value of the desired value computation.

In the preferred embodiment, the position of the operator-controlled element 42 is detected by two redundant measuring devices 30 and 32. The stop values of these measuring devices are both determined in correspondence to the procedures described below. In a preferred embodiment, the determined stop value for a measurement signal is only then assumed when the conditions necessary therefor are present simultaneously for both stop values. In other embodiments, a separate mutually independent detection of the end positions for the two measuring devices is taken into consideration.

Figure 2A:
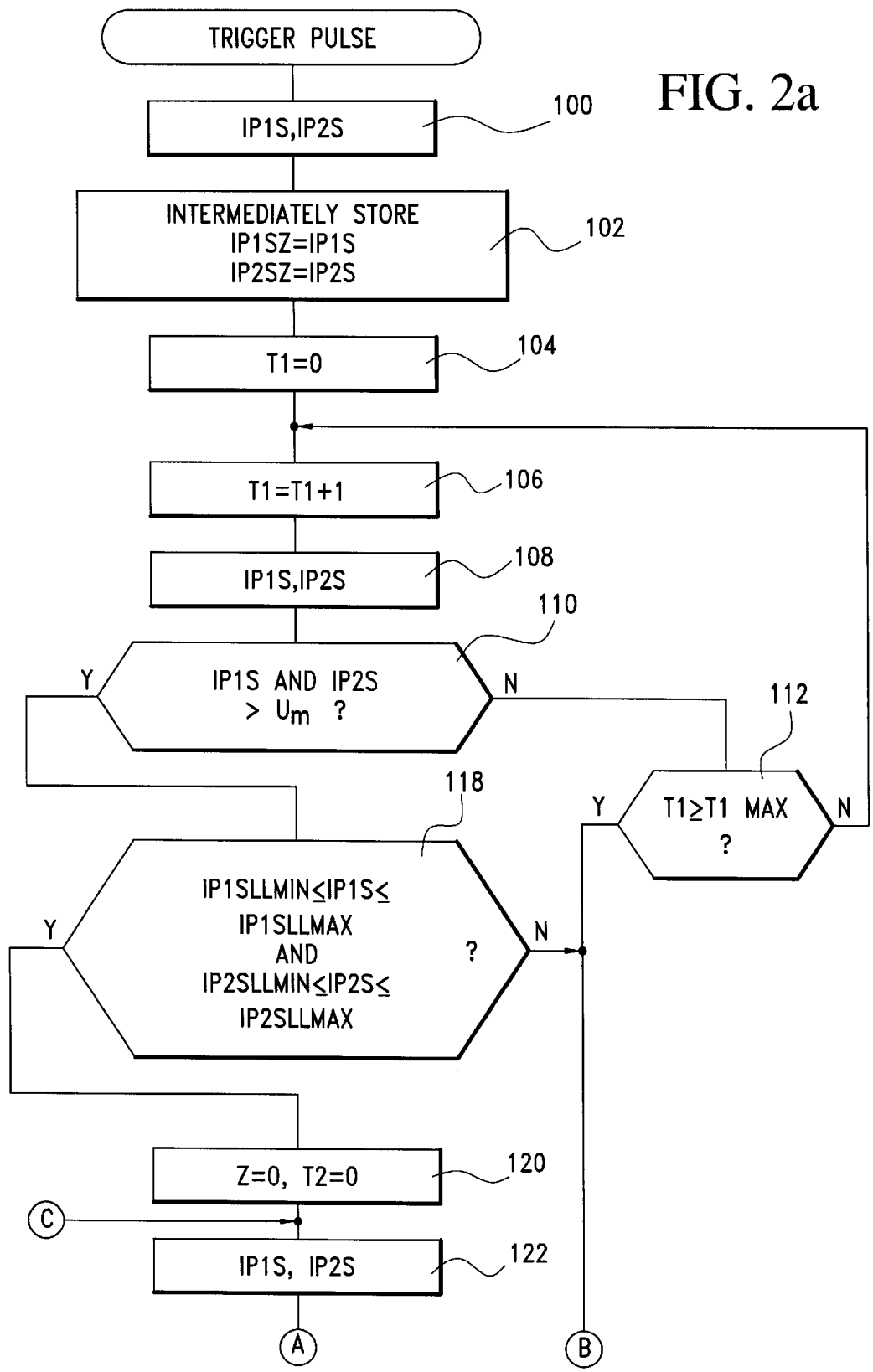
FIGS. 2a and 2b show the method of detecting the stop value for the operation of a motor vehicle or engine in the context of a flowchart.
Figure 2B:
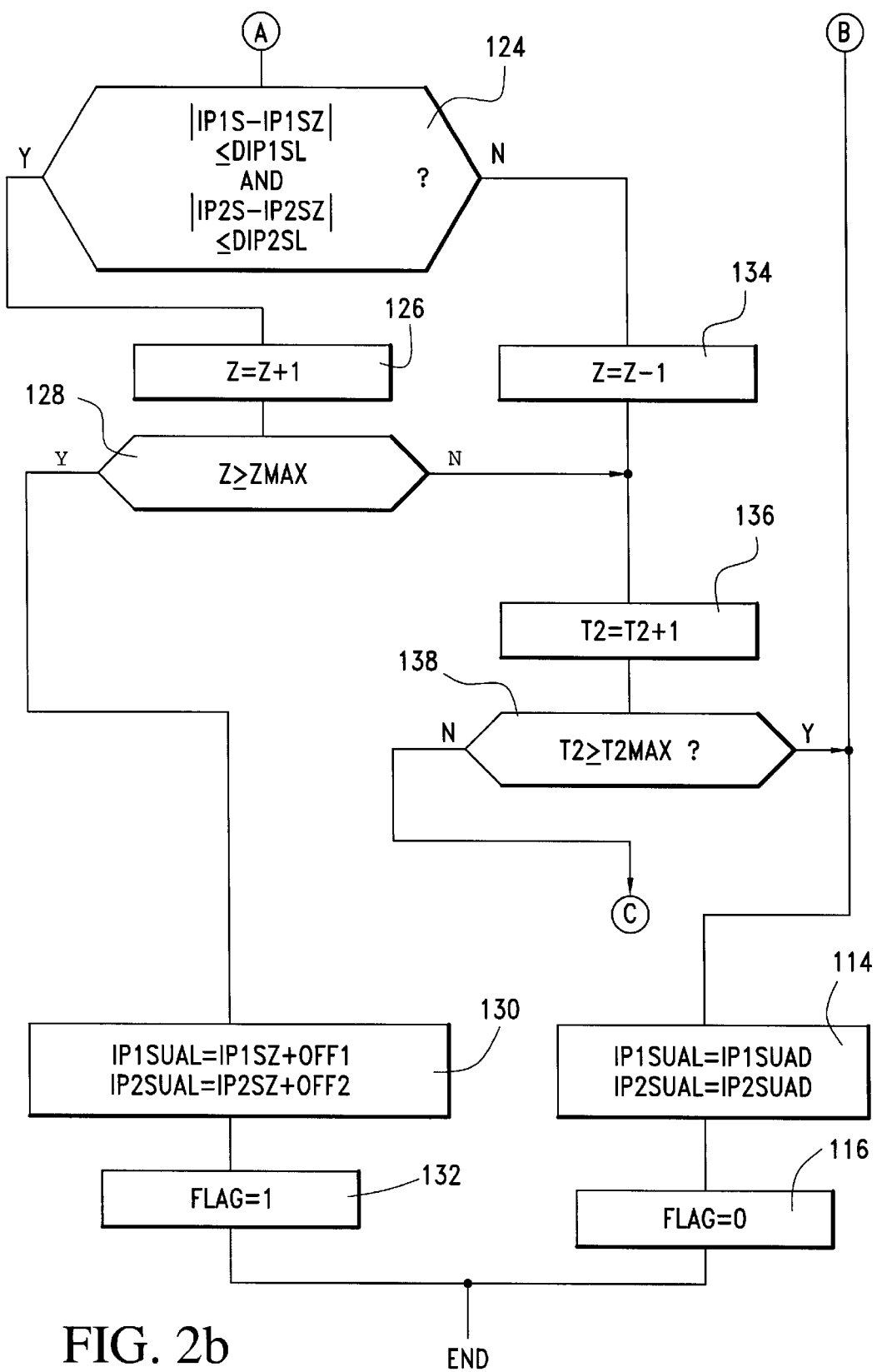

FIGS. 2a and 2b show the procedure of the invention for detecting the lower stop at least of a position transducer outside of the operation of the motor vehicle. The position transducer is connected to an operator-controlled element actuated by the driver. The program shown in FIGS. 2a and 2b is run in the microcomputer 12 of the control unit 10 and is initiated by a corresponding pulse of a test apparatus 48 connected to the control unit via the line 46. This test apparatus is connected at the end of the assembly line of the automobile manufacturer and/or in the service center.

In the first step 100, and in the preferred embodiment, the two measurement values IP1S and IP2S of the measuring devices 30 and 32, respectively, are read in and in the next step 102, the two measurement values are stored as IP1SZ and IP2SZ. In the next steps 104 to 112, a check is made as to whether, for the actuation of the operator-controlled element, the signal values of the measuring devices change as wanted. This check has as a condition precedent that the operator-controlled element 42 is actuated by the operator or is actuated in an automatic manner. In another embodiment, this check can be omitted.

For making the check, a first counter T1 is set to zero in step 104. The counter T1 is incremented in step 106. In the next step 108, the signal values IP1S and IP2S are read in. In the inquiry step 110, a check is made as to whether these signal values exceed a pregiven minimum voltage value, that is, whether the change of the measured values wanted via pedal actuation is detected. If this is not the case, then a check is made in step 112 as to whether the counter T1 has reached its maximum value T1MAX or has exceeded the latter. If this is not the case, then the check is repeated in step 106. If the counter T1 reached its maximum value without the signal values having exceeded the minimum value $U_{MIN}$, then in step 114 (FIG. 2b), the corresponding prestored substitute values IP1SUAD and IP2SUAD are set for the lower stop values IP1SUAL and IP2SUAL. These substitute values correspond to the maximum tolerance values, if required, with the addition of an offset value.

In the next step 116, a mark is set to a value which indicates that the learning operation of the stop has not been carried out. This mark can then be interrogated in the context of fault checks. The subprogram is then ended and is again initiated only with a new pulse of the test apparatus 48.

If the measured values exceed the minimum value in step 110, then, after a delay time and for a released accelerator pedal, a check is made in inquiry step 118 as to whether the measured values lie within a pregiven permissible value window. This window is formed about the signal value to be expected for a released operator-controlled element. If either the signal value IP1S or the signal value IP2S is not within this value range, then the program continues with step 114. Otherwise, when both measured values lie within the value window, a counter Z is set to zero in step 120 and an additional counter T2 is set to zero.

In the next step 122, the measured values IP1S and IP2S are read in. In step 124, the amounts of the difference of these values is formed with the intermediately stored value (step 102) and compared to a permissible maximum value DIP1SL or DIP2SL. If both amounts of the differences are below this minimum value, then, in step 126, the counter Z is incremented. In the next step 128, the count of the counter is compared to a pregiven maximum value ZMAX. If the count of the counter has reached or exceeded this maximum value, that is, if both difference amounts drop below the minimum amount sequentially a number of times, then, in step 130, the stop values IP1SUAL and IP2SUAL are set to the intermediately-stored values IP1SZ and IP2SZ plus offsets values OFF1 and OFF2, as required. In the next step 132, the mark is set to a value which shows that the learning operation was completed successfully. The program is ended after step 132.

If in step 124, at least one of the two difference values exceeds the pregiven minimum value, then in step 134, the counter Z is decremented or, in the alternative, set to zero. In the next step 136, which is initiated also in the case of a negative answer in step 128, the counter T2 is incremented. Thereupon, in step 138, the count of the counter T2 is compared to a maximum value. If the count has reached or exceeded this maximum value without the condition, which was asked in step 124, occurring sufficiently often, then the program continues with step 114 and the substitute values. Otherwise, the subprogram is repeated with step 122.

In another embodiment, the sequence of the steps is modified. Steps 100, 104 to 110 and 118 are executed after recognizing the pulse, then for a positive answer in step 118, step 102 is executed.

Figure 3:
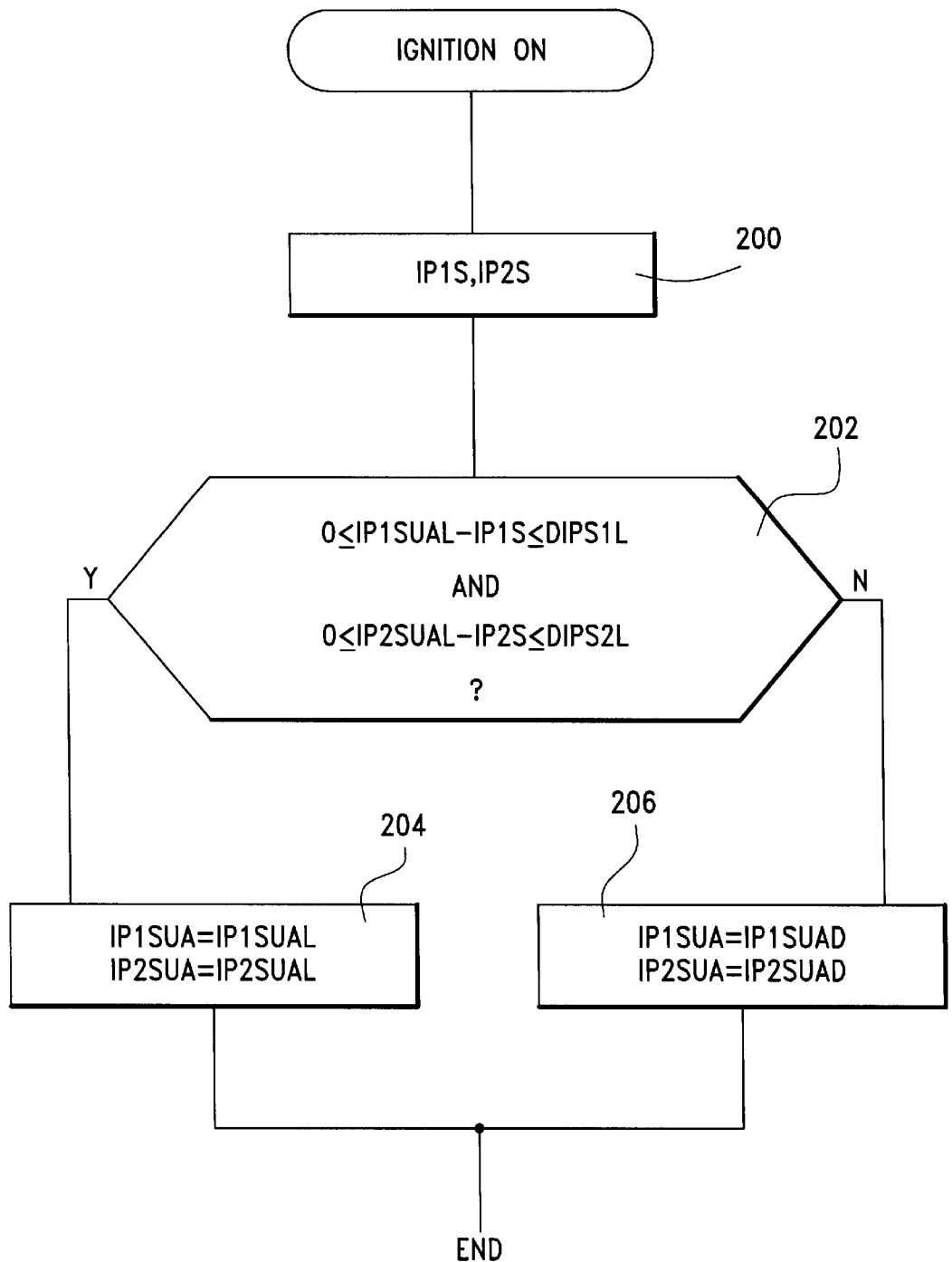
FIG. 3 is a flowchart for detecting the stop value when the engine is started; and, FIG. 4 is a flowchart for evaluating the measurement signal as well as a stored stop value for forming the position signal during operation of the motor vehicle and drive unit.

FIG. 3 shows a program which is initiated for checking the stored stop value, which is learned during or outside of the operation, when switching on the voltage supply of the control unit 10 (ignition on). In the first step 200, the measured values IP1S and IP2S are read in. In the next-following inquiry step 202, the difference between the stored stop values IP1SUAL and IP2SUAL is checked with the particular measured value as to a pregiven value range. If the two differences are within the pregiven value range (which extends from zero to a maximum difference value DIPS1L or DIPS2L), then, in accordance with step 204, the lower stop value IP1SUA is set to the stored value IP1SUAL or the stop value IP2SUA, which is provided for the second position transducer, is set to the value IP2SUAL and the subprogram is ended. If the condition, which is checked in step 202, is not satisfied for at least one of the position transducer signals then, in accordance with step 206, the substitute values IP1SUAD and IP2SUAD are set as stop values for the operation and the subprogram is ended. The substitute values are in lieu of the stored stop values.

In FIG. 4, a preferred procedure during operation of the motor is shown in the context of a flowchart. The flowchart shows a solution wherein the stop values, which are determined under test apparatus operation, do not change over the service life of the position transducer. In this solution, no learning operation in the sense of the state of the art takes place during operation. The program shown in FIG. 4 is initiated at pregiven time points.

In the first step 300, the measured values IP1S and IP2S are read in. In the next step 301, a check is made as to whether substitute values must form the basis of the desired value computation. If this is not the case, then in the next step 302, the complementarily stored stop values IP1SUAL and IP1SUALK or IP2SUAL and IP2SUALK are read in. In the next inquiry step 304, a check is made as to whether deviations are present between these values. If at least one value deviates from its complementarily stored value, then in step 306, the particular substitute values IP1SUAD and IP2SUAD are entered as stop values. After step 306, in the case of a positive answer in step 304 or step 301, a check is made in step 308 as to whether the brake is actuated. If this is not the case, then, in step 310, the desired value SPS for the motor control is determined on the basis of the measured value of the first position transducer IP1S as well as its stop value IP1SUAL and the subprogram is ended. If the brake is actuated, then, in step 312, the measured values are compared to a maximum value for the released operator-controlled element. If the measured values exceed this maximum value, then the subprogram continues with step 310; otherwise, when the two measured values drop below the maximum value, then according to step 314, the desired value SPS is set to a value which represents the released operator-controlled element and the subprogram is ended.

The procedure shown in FIG. 4 is carried out in the context of an additional embodiment even when the stop values are learned during the operation in the sense of the state of the art. In this case, the complementarily stored values are the values determined during operation.

In another embodiment, in addition or alternatively to the test apparatus operation, the first-time determination of the stop value is carried out with the presence of a defined state of the control unit and/or for a defined sequence of specific actuations of the operator-controlled element.

The control unit exhibits a mark which is set to a different value when the control unit is taken into service for the first time and/or when the voltage is applied for the first time after the battery was disconnected. If the control unit recognizes this first time in service, then the control unit executes the procedure shown in FIG. 2. This mark can then, if required, be reset via a test apparatus in order to execute a new calibration when there is an exchange of components by authorized personnel.

Furthermore, in one embodiment, in addition or in the alternative, the procedure shown in FIG. 2 can be carried out for a defined sequence of specific actuations of actuator elements. This sequence comprises, for example, a pregiven number of rotations of the ignition key, a pregiven number of pedal actuations (accelerator pedal, brake pedal), predetermined blinker-lever operating procedures in a specific time period.

In the procedure shown in FIG. 2, the measured values IP1S and IP2S are intermediately stored when detected for the first time. As an alternative to this procedure, the measured values are cyclically determined in another embodiment and the following are intermediately stored: at least one selected measured value, a mean value of these measured values, at least one value derived from these measured values in another manner or a pregiven number of essentially like measured values for each measurement signal. This at least one intermediately stored value or a value derived from this at least one intermediately stored value (for example, intermediately stored value+offset, mean value, et cetera) is stored as a stop value when the measured values drop below a pregiven limit value several times consecutively or at a specific frequency.

It is understood that the foregoing description is that of the preferred embodiments of the invention and that various changes and modifications may be made thereto without departing from the spirit and scope of the invention as defined in the appended claims.

What is claimed is:

1. A method for detecting a changing quantity for a motor vehicle including an operator-controlled element and a drive unit, the method comprising the steps of:

utilizing a measuring device to detect the position of said operator-controlled element;

determining at least one measurement value corresponding to the released operator-controlled element;

determining a desired value for the control of said drive unit of said motor vehicle on the basis of said at least one detected value and the corresponding stored stop value during the operating cycle of said drive unit of said vehicle; and, said desired value corresponding to the value of the released operator-controlled element being independent of the stored stop value when the brake is actuated and the measured value is in the idle value range.

2. A method for detecting a changing quantity for a motor vehicle including an operator-controlled element and a drive unit, the method comprising the steps of:

utilizing a measuring device to detect the position of said operator-controlled element;

determining at least one measurement value corresponding to the operator-controlled element when said operator-controlled element is released;

redundantly storing at least one detected stop value;

with each use of a stored stop value, comparing said stored stop value to a complementary value thereof; and, if there is a deviation between said stored stop value and said complementary value thereof, pregiving a substitute value in lieu of said stored stop value.

3. An arrangement for detecting a changing quantity in a motor vehicle including an operator-controlled element, the arrangement comprising:

a control unit;

a measuring device for supplying a measurement value to said control unit and said measurement value representing the position of said operator-controlled element;

said control unit being adapted to determine a measurement value corresponding to the released operator-controlled element;

means for determining a desired value for the control of said drive unit of said motor vehicle on the basis of at least one detected value and the corresponding stored stop value during the operating cycle of said drive unit of said vehicle; and, said desired value corresponding to the value of the released operator-controlled element being independent of the stored stop value when the brake is actuated and the measured value is in the idle value range.

4. An arrangement for detecting a changing quantity in a motor vehicle including an operator-controlled element, the arrangement comprising:

a control unit having a memory;

a measuring device for supplying a measurement value to said control unit and said measurement value representing the position of said operator-controlled element;

said control unit being adapted to determine a measurement value corresponding to the released operator-controlled element;

said control unit including means for redundantly storing at least one detected stop value in said memory;

said control unit including means for comparing said stored stop value to a complementary value thereof with each use of a stored stop value; and, if there is a deviation between said stored stop value and said complementary value thereof, pregiving a substitute value in lieu of said stored stop value.

* * * * *